United States Patent

Thornley

[15] 3,665,429

[45] May 23, 1972

[54] RECORDED SIGNAL ENHANCING APPARATUS AND METHOD

[72] Inventor: Richard F. M. Thornley, Pine Brook Hills, Boulder, Colo.

[73] Assignee: International Business Machines Corporation, Armonk, N.Y.

[22] Filed: Sept. 18, 1970

[21] Appl. No.: 73,288

[52] U.S. Cl............340/174.1 H, 179/100.2 K, 340/174.1 B, 340/174.1 F

[51] Int. Cl.........................................G11b 5/44, G11b 5/26

[58] Field of Search...........179/100.2 B, 100.2 MD, 100.2 K, 179/100.2 RE; 340/174.1 A, 174.1 B, 174.1 F, 174.1 H

[56] References Cited

UNITED STATES PATENTS

| | | | |
|---|---|---|---|
| 873,541 | 12/1907 | Hagemann | 179/100.2 MD |
| 2,836,359 | 5/1958 | Mazzagatti | 235/183 |
| 2,105,318 | 1/1938 | Goldsmith | 179/100.2 RE |
| 3,247,483 | 4/1966 | Wood | 340/174.1 H |

FOREIGN PATENTS OR APPLICATIONS

| | | |
|---|---|---|
| 823,549 | 3/1956 | Great Britain |

*Primary Examiner*—Bernard Konick
*Assistant Examiner*—J. Russell Goudeau
*Attorney*—Hanifin and Jancin and Gunter A. Hauptman

[57] ABSTRACT

Previously recorded magnetizable spot indicia carried on a magnetic surface medium, are each repeatedly accessed for reading by a magnetic head transducer by relative motion of the surface and the head. Each time that the spot is read, the head supplies an output signal which is combined with previous and subsequent signals caused by repeated reading of the same spot. An enhanced signal, with a signal-to-noise ratio better than that normally obtainable, is formed by combining all output signals caused by repeated reading of a spot.

10 Claims, 10 Drawing Figures

INVENTOR
RICHARD F. M. THORNLEY

BY [signature]

ATTORNEY

RECORDED SIGNAL ENHANCING APPARATUS AND METHOD

BACKGROUND OF THE INVENTION

1. Field of the Invention

The invention relates to electronic data processing apparatus and a method for processing electronic data. More particularly, the invention permits detection as enhanced outputs of information carried as indicia on a medium.

2. Description of the Prior Art

Audio, visual, digital or other sensible information may be recorded for future accessing on a punchable, magnetizable, markable or other manifestable medium. An optical, mechanical, electrical or magnetic transducer may access the recorded information by relative motion between the medium and the transducer. Physical limitation on the medium and the transducer and their chemical, electrical, magnetic, mechanical, etc. properties, together with the amount of recorded information and the relative velocity of the medium and head all contribute to limit the ability of the transducer to accurately access the recorded information. One aspect of this problem is illustrated by a decreased electrical output signal amplitude from a magnetic head, reading magnetized spots on a magnetic surface, when the size and spacing of spots is diminished. A similar phenomena occurs when the spacing of holes in punched cards or paper tape is decreased, or whenever the amount of information on any medium accessed by motion is increased. It follows that the amount of information recordable on a medium can be increased if the weaker transducer outputs can be enhanced. One expression of this goal is to increase the signal-to-noise ratio.

In the prior art, there are disclosed many techniques for increasing the signal-to-noise ratio of information and enhancing the information carrying aspects of a signal. For example, an electrical signal may be propagated down a tapped delay line and sensed by cumulative delay circuits at each tap in synchronim with the signal's propagation to amplify the original signal. However, this technique causes attenuation of the propagated signal limiting the amplification and signal-to-noise improvement obtainable. The prior art also shows sensing copies of one recorded signal by several magnetic transducers by re-recording the input signal on several tracks of a rotating drum for amplification by accumulation. This technique does not, however, increase the signal-to-noise ratio and may, due to copying losses, decrease it. A variety of prior art magnetic recording and reading devices utilize a plurality of magnetic heads for serially reading the same information track on a moving tape, drum or disc. These devices achieve many useful results, such as synthetic audio reverberation, missing signal continuation, electrical accumulation, character recognition, etc., but do not address the problem of enhancing the output obtainable as described above.

SUMMARY OF THE INVENTION

The invention is an apparatus and a method for enhancing the information-indicating output obtainable from a transducer by repeatedly accessing each of the recorded indicia and combining the results of the repeated accesses of each of the indicia to form a single enhanced output representative of that one of the indicia. In one form of the invention, the information is carried as indicia on a medium which is in relative motion with a multi-position transducer. Each position supplies an output upon accessing one of the indicia, delay means receive the transducer position outputs, as each indicia is accessed by each position in turn, and supply delayed outputs in step with the relative motion so that the delayed outputs may be combined to form a single enhanced output for for each of the accessed indicia. In another embodiment, a single-position transducer repeatedly accesses the same one of the indicia while the output is accumulated in either digital or analog form.

The foregoing and other objects, features and advantages of the invention will be apparent from the following more particular description of preferred embodiments of the invention, as illustrated in the accompanying drawings.

THE PREFERRED EMBODIMENT

General Description

Figure 1A:
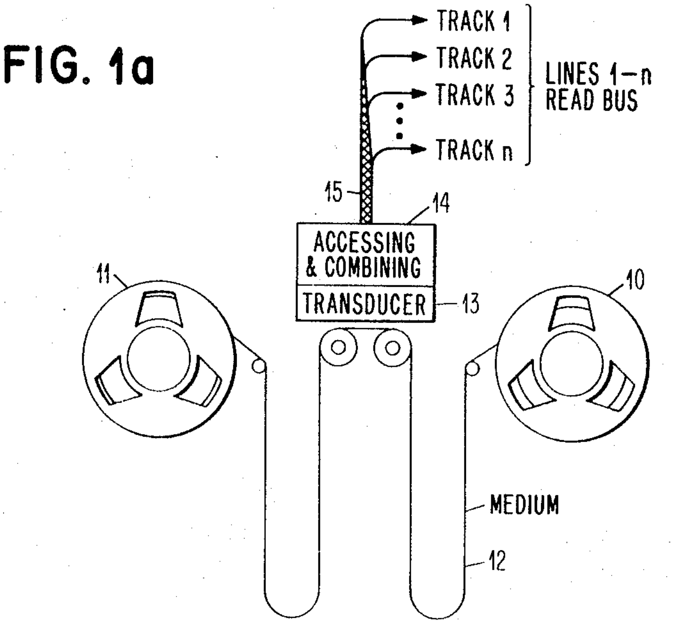
FIG. 1*a* shows the recorded signal enhancing apparatus in connection with a tape drive.

Referring first to FIG. 1*a*, a take-up reel 10 and a supply reel 11 cause medium 12 to pass transducer 13 connected to accessing and combining means 14 which transfer signals determined by indicia recorded on medium 12 to a read bus 15 having *n* lines, one of each of *n* tracks. While, for the purposes of illustration, medium 12 is a magnetic tape and the transducer 13 is a magnetic head, the medium may be paper, wire, film, etc., and the transducer may be contacts, phototubes, etc. Electrical signals are recorded as magnetic spots on the medium 12 in the format indicated in FIG. 1*b*. Data indicia 16 and (when provided) synchronization indicia 17 are recorded on *n* tracks, each indicia having a recording length *a* and width *b* or *c*. The length and the width of each of the indicia is determined by various well known factors, some of which will be discussed later. It is not necessary to explain the principles involved in recording electrical signals on magnetic recording media because such recording and reading is well known in the art.

The accessing and combining circuits 14 will be generally described with reference to FIGS. 2*a*–2*c*, and the transducer 13 will be described in connection with FIG. 3. A detailed structural and operational description of the FIG. 2*a* version will be given with respect to FIGS. 4 and 5.

Figure 2A:
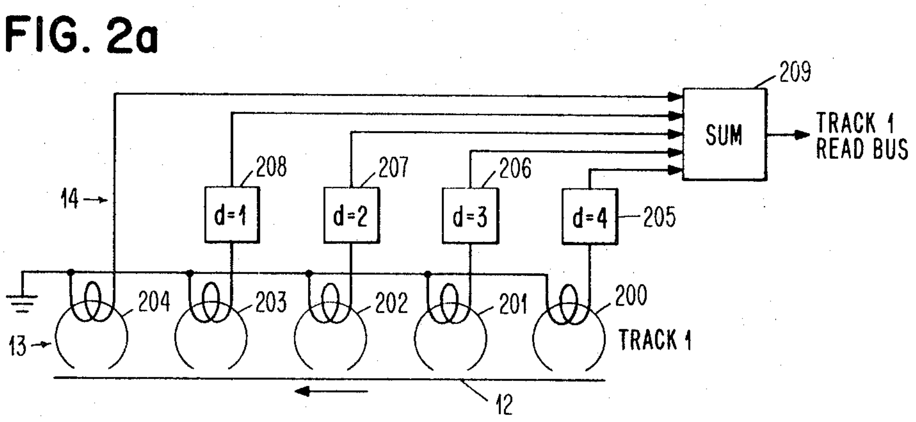
FIGS. 2*a*, 2*b*, 2*c* are logic diagrams showing three versions of the accessing and combining apparatus of FIG. 1*a;*
Figure 2B:
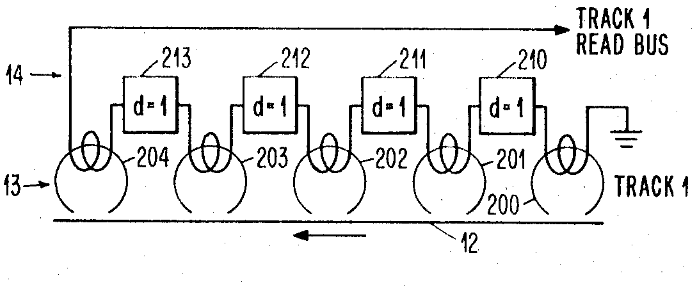
Figure 2C:
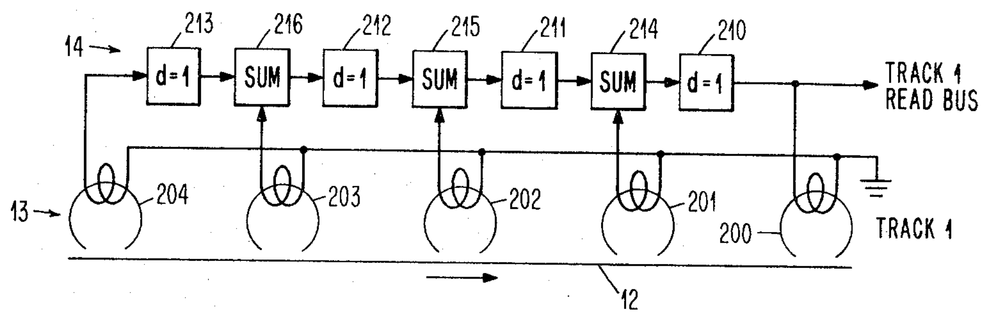
Figure 6:
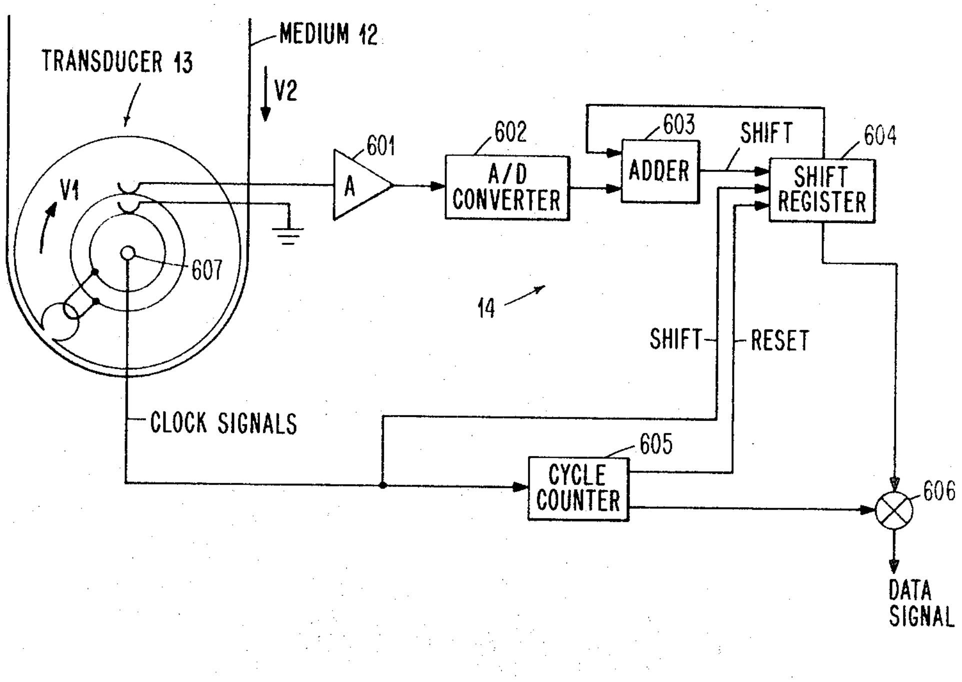
FIGS. 6 and 7 are block diagrams of alternative embodiments of apparatus for enhancing signals.

Referring to FIGS. 2*a*, 2*b*, and 2*c*, there are shown three versions of circuits for reading information previously recorded as magnetic indicia 16 on a track, for example track 1, on a medium 12, shown as magnetic tape. Referring first to FIG. 2*a*, a single indicia 16 is moved in the direction of the arrow, past compound magnetic head 13 comprising separate read heads 200–204. In this way, the same one of the indicia 16 is successively read by each of the heads to cause an electrical signal to be generated in the windings of the respective heads 200–204. It is, of course, not necessary that the medium 12 move past the head 13, it sufficing that there be relative motion between the medium 12 and the transducer 13. Delay circuits 205–208 (which may be sonic, lumped constant, or other similar analog circuits) are arranged to have unspecified time values, shown as even integers for illustration, chosen to synchronize the passage of signals from the delay circuits with the relative motion of the medium 12 and the head 13. For example, when indicia 16 passes under head 200, an input signal is provided to the delay circuit 205, which will supply that signal to its output at time *t* when that same indicia 16 is being read by head 204. Similarly, delay circuit 206 results in an output at the same time *t;* therefore; all of the signals resulting from the reading of the same indicia 16 by the delay circuits 205–208, will be available to sum circuit 209 simultaneously at time *t*. Sum circuit 209 combines the signals to provide a single enhanced electrical signal to track 1 of the read bus 15. The sum circuit 209 may comprise the number of analog or digital combining circuits or mechanisms known in the art (such as multiple input amplifiers), some of which will be described subsequently with respect to FIGS. 6 and 7.

Referring now to FIG. 2*b*, the sum circuit 209 of FIG. 2*a* is eliminated and identical delay circuits are used. Delay circuits 210–213 are each inserted in series with respective ones of heads 200–204. Each delay circuit 210–213 has the same time delay ($d=1$). Therefore, when head 200 senses indicia 16, the signal resulting from reading of indicia 16 will enter delay circuit 210 and emerge from that delay circuit at the time that head 201 reads the same indicia 16. The output of delay circuit 210 will then be combined with the signal caused by the same indicia when it is read by head 201 to give the input of delay circuit 211 an enhanced input, etc. Repetition of the reading of the indicia and the enhancement of the resultant electrical signal accumulates in each of the delay circuits until a fully enhanced version of indicia 16 appears on line "track 1" of read bus 15.

Referring now to FIG. 2*c*, another version utilizing distributed sum circuits 214, 215, and 216 and identical delay circuits 210–213 is shown. Inasmuch as the direction of tape motion is irrelevant, tape 12 is shown passing head 204 first. Otherwise, this circuit works in the identical manner as the circuit of FIG. 2*b;* the provision of sum circuits 214, 215, and 216 permitting isolation of the heads 200–204 and the delay circuits 205–208.

There is no limit to the number of times a single one of the indicia 16 may be sensed and enhanced, and any number of read heads, summing circuits, and delay circuits may be provided.

Figure 3:
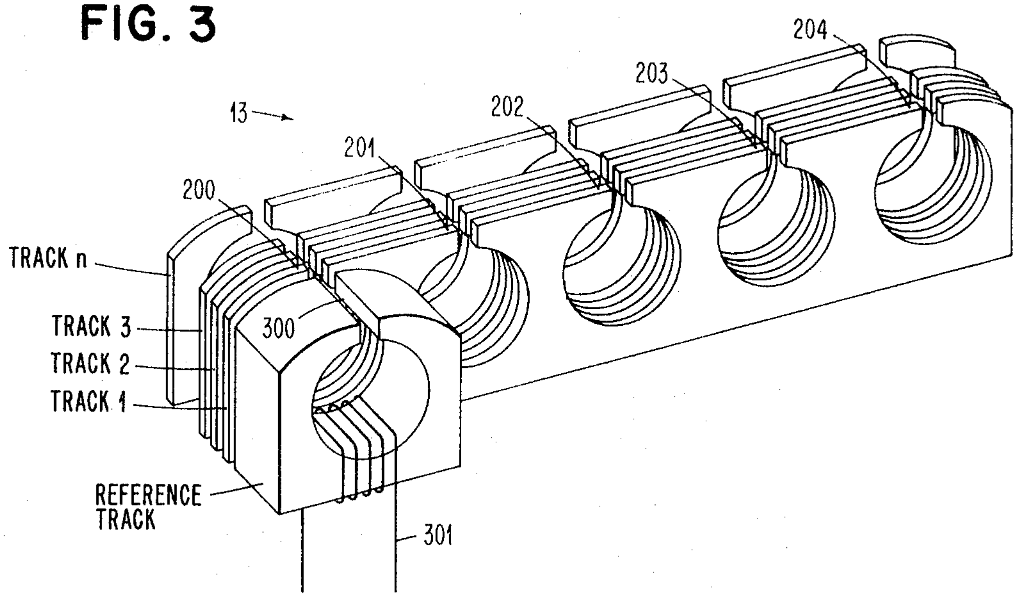
FIG. 3 shows the detailed construction of the transducer of FIG. 1*a;*

Referring now to FIG. 3, detailed construction of a transducer 13 usable in the apparatus of FIG. 1 is shown. The transducer is a compound five-position magnetic head composed of a single lamination for each of the tracks. An additional reference track is shown for information and will be described subsequently with reference to FIG. 4. Each head is provided with a gap (for example, 300) and a winding (for example, 301) of construction well known in the art. Electrical signals recorded as indicia on magnetic tape are recreated in the windings when the indicia pass the gaps associated windings in the usual manner described in the art. The transducer 13 may also be adapted for motion relative to stationary tape, or the transducer and media may both move at different speeds.

DETAILED DESCRIPTION

Figure 4:
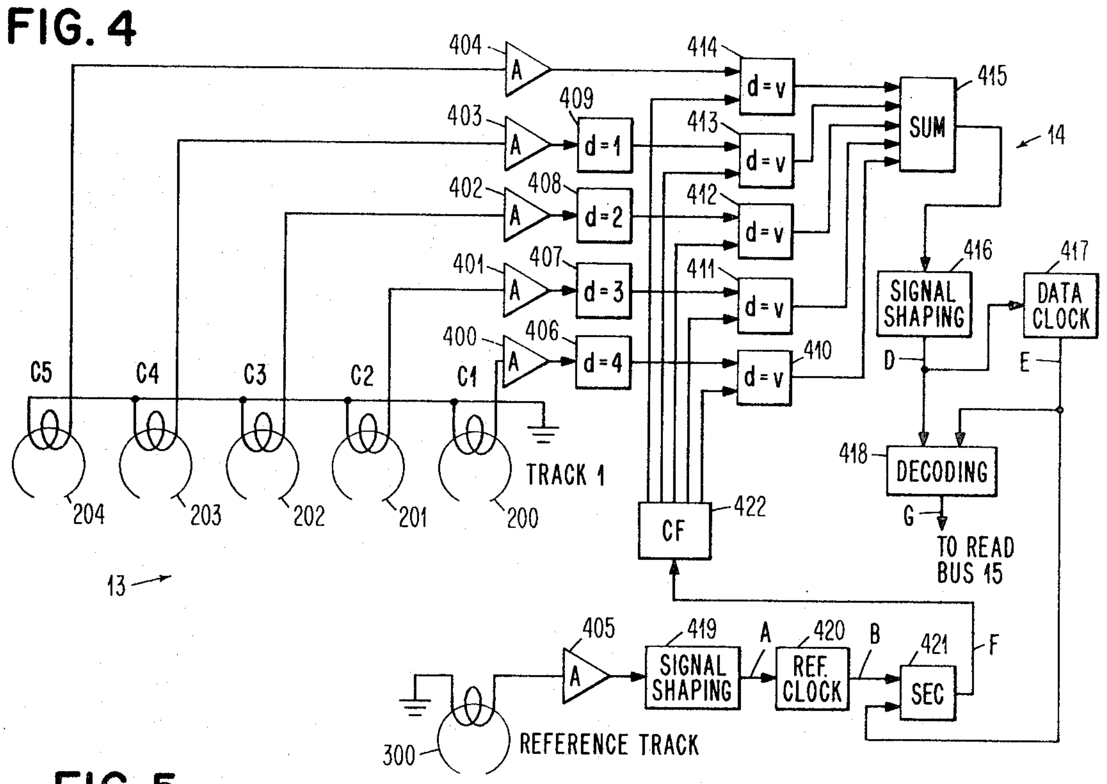
FIG. 4 is a detailed logic diagram showing accessing and combining circuit of FIG. 2*a;*

Referring now to FIG. 4, a detailed circuit of the embodiment of FIG. 1*a* based on the principles described with reference to FIG. 2*a*, will be described. Similar circuits, based on the principles described with reference to FIGS. 2*b* and 2*c*, are similar in construction to that shown in FIG. 4.

Figure 1B:
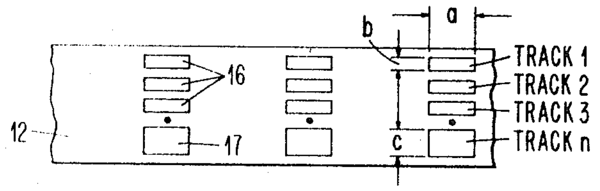
FIG. 1*b* shows a detail of indicia recorded on the tape drive of FIG. 1*a;*

The circuit of FIG. 4 reads electrical signals recorded as magnetic spots on a medium 12, as shown in FIG. 1*b*. For each data track 1 through *n*, there is provided one of heads 200, 201, 202, 203, and 204, and a single head 300 is provided for the reference track. The reference track synchronizes the reading of data tracks to correct for static and dynamic skew. Indicia on track 1 are sensed by heads 200–204 and are amplified by amplifiers 400–404, four of which are each connected to one of the delay circuits 406–409. The delays 406–409 are chosen as a function of the medium velocity so that all the signals from the heads 200–204 will be simultaneously available. A sum circuit 415 is connected to the outputs of the delay circuits 406–409 and the amplifier 404 through variable delay circuits 410–413. Variable delay circuits 410–413 are well known in the art; for example, see SOLID STATE MAGNETIC AND DIELECTRIC DEVICES, by H. W. Katz, published 1959, by Wiley, N. Y., page 262. The amount of delay inserted by the delay circuits 410– 413 is determined by the output of cathode follower 422 as a function of information derived from the reference track in any prior art manner for deriving reference information from magnetic tape data. For example, see U.S. Pat. No. 2,864,078, "Phased, Timed Pulse Generating," by L. D. Seader, and U.S. Pat. No. 3,150,358, "Data Detection System for Reproducing Magnetic Binary Information," by E. G. Newman et al., both assigned to International Business Machines Corporation, Armonk, New York. The reference track head 300 emits a signal, amplified by amplifier 405, and shaped signal shaping circuit 419, which periodically synchronizes a free-running reference clock 412. Similarly, the sum circuit 415 output is shaped by circuit 416 and then periodically synchronizes a free-running data clock 417. The difference between the outputs of the clocks 420 and 417 is recognized by a skew error correction (SEC) circuit 421, which supplies a correction signal to the delays 410–414 via the circuit 422. The amount of delay inserted by the variable delay circuits 410–413 will, in the normal case, be identical for each of the delay circuits in each track, but different for each track. The output of the sum circuit 415 is connected to the decoding circuit 418 to supply a final enhanced output data signal to the read bus 15.

Figure 5:
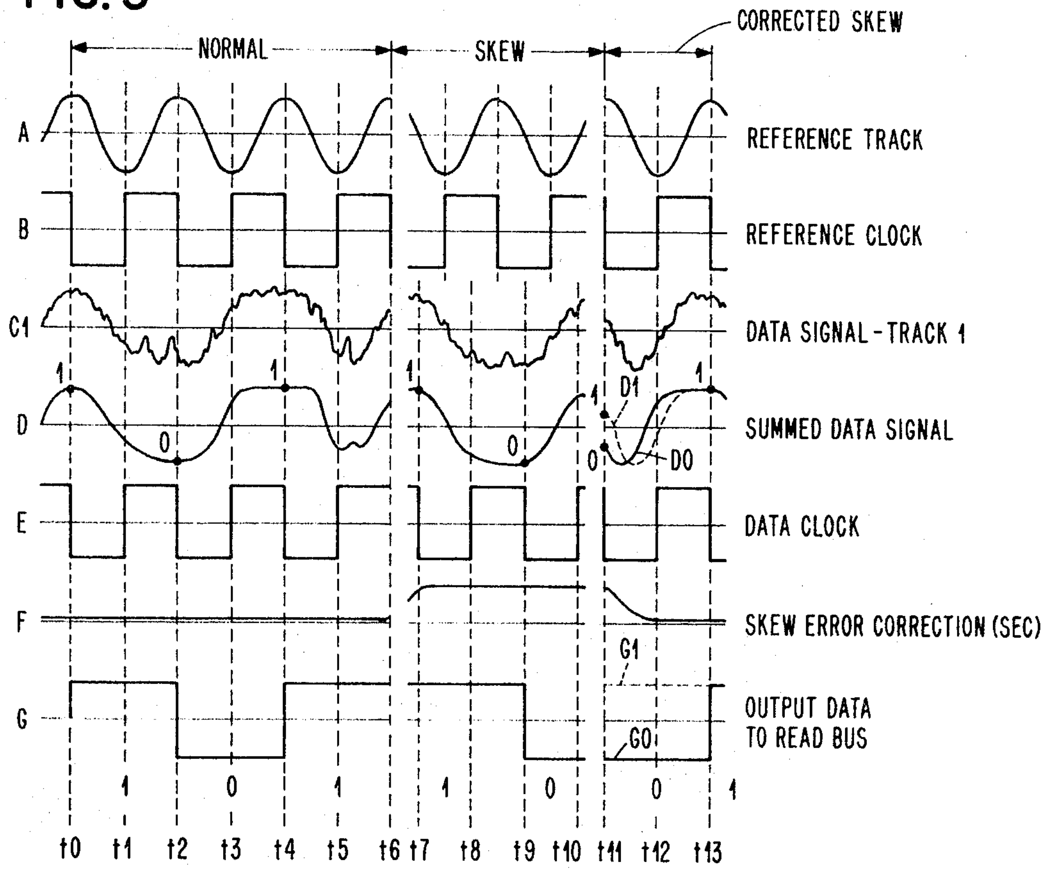
FIG. 5 is a waveform diagram showing signals present at various points in the circuit of FIG. 4.

Operation of the circuit of FIG. 4 will now be described with reference to FIG. 5, which shows normal, skewed, and corrected operation. In normal operation, a signal recorded as one of the indicia on track 1 and a signal on the reference track are read by the heads as signals at points C1 through C5 and A. The reference clock 420 receives the signal on the reference track A and reverses a pulse B for each signal maximum and minimum. Signals C1 through C5 are amplified and appropriately delayed to give a coincident summed and shaped data signal D. The summed data signal operates the data clock 417 to give a signal E which is made negative by each data signal maximum and minimum and is returned positive at a time calculated to be in step with each reference clock positive shift. Final output signal G is the value of summed data signal D at each negative shift of the data clock E. In normal operation, signals at points E and B are identical, and no skew correction F is necessary by the SEC circuit 421. If there is a skewed signal D0 the output signal to G0 may be incorrect because when the data clock samples the summed data signal at time t11, the skewed signal D0 incorrectly indicates a negative (0) value. However, such a signal is recognized by the SEC circuit 421 at time *t*6 to give an error signal F which inserts a delay during periods *t*6 through t11. The effect of such a correction is shown (dashed) during times t11 through *t*13 as a sum signal D1 giving a correct output G1 (dashed). The final output data signal G to the read bus 15 occurs with each data clock phase reversal coinciding with a maximum and/or minimum of the summed data signal.

ALTERNATIVE EMBODIMENTS

Referring now to FIG. 6*a*, an embodiment of a device having a moving transducer, as opposed to the static transducer of FIG. 4, will now be described. It will be understood that the detailed circuits of FIG. 6*a* apply equally well to FIGS. 2*a*, 2*b*, and 2*c*. Both transducer 13 and medium 12 are in motion, the number of times $N$ that one of the indicia is accessed being determined by the relationship: $N = V_1/V_2(\theta)\ (1-V_2/V_1)$ where:

$V_1$ is the velocity of the transducer 13

$V_2$ is the velocity of the medium 12

$\theta$ is the wrap angle defining the portion of the transducer circumference in contact with the medium. Depending upon the value of $N$ (which should be an integer), the transducer 13 will scan each spot on medium 12 $N$ times. A slip ring 607 is monitored to give clock signals indicating the number of complete revolutions of the transducer 13 which are recorded by a cycle counter 605. Signals sensed as a result of the relative motion of the medium 12 and the transducer 13 are passed through an amplifier 601 to an analog-to-digital converter 602. A digital number emerges from the converter 602 representative of the value of the signal sensed by the transducer 13. This digital number is accumulated by means of shift register 604 and adder 603. Each time that the same one of the indicia is sensed, it is entered in the shift register and added to the value previously present in the shift register by means of a loop through the adder 603. After each entry, the number in the shift register is shifted one position. It is possible to store in the shift register a digital representation of as many numbers on the medium 12 as can be sensed by rotation of the transducer 13. Therefore, for each rotation of the transducer 13, each number present in the shift register is added to a corresponding number resulting from the current scanning. As shift register 604 is shifted, the first digit recorded in the shift register, enhanced by shifting through the adder 603 *N* times, emerges from the shift register and is gated by the cycle counter 605 by a gate 606 to the data signal line. Thus, each of the indicia is converted into a digital signal and added to itself *N* times before being placed on the data signal line.

Figure 7:
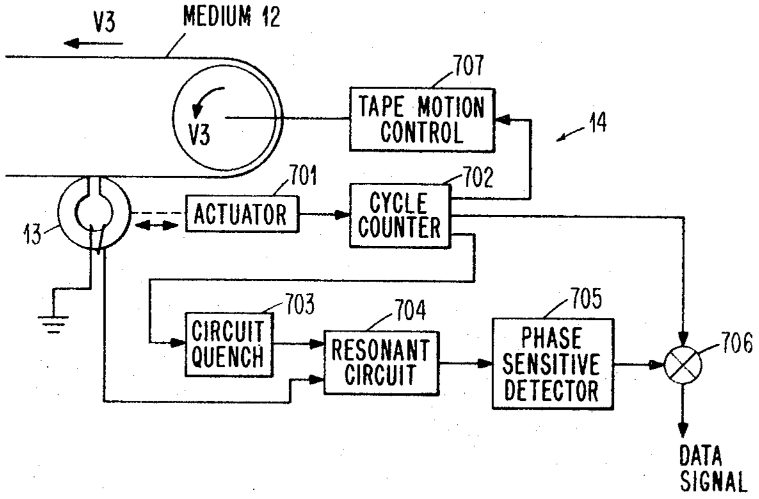

Still another embodiment is shown in FIG. 7 wherein medium 12 moves past a head 13, which is vibrated by an actuator 701. Thus, each one of the indicia on medium 12 is accessed a number of times dictated by the number of times that head 13 is vibrated by the actuator 701. The indicia may be held at one position relative to the head 13 by means of a tape motion control 707, which is stepped by a cycle counter 702 after a fixed number of vibrations by the actuator 701. Signals sensed by the transducer 13 are entered in a resonant circuit 704, which strengthens the signal by oscillatory enhancement. A phase sensitive detector 705 is gated by the cycle counter 702 through a gate 706 after a fixed number of vibrations of the head 13. The resonant circuit builds up the voltage across it as a result of the oscillation of the transducer 13, and, when it is gated by the cycle counter 702, the circuit is quenched by means of a quench circuit 703. The quench circuit 703 may comprise a simple relay-operated short circuit.

While the invention has been particularly shown and described with reference to a preferred embodiment thereof, it will be understood by those skilled in the art that various changes in the form and details may be made therein without departing from the spirit and scope of the invention.

What is claimed is:

1. Apparatus for enhancing the information-indicating output obtainable from information carried as indicia on a medium including:

a transducer, having a number of positions, each position operable to repeatedly access the indicia on said medium available to said position and to cause an output for each access;

motive means, associated with said medium and transducer, for relatively moving said medium and transducer to make each indicia in turn available for accessing by the transducer position;

counting means, associated with said transducer and motive means, operable to supply a signal when said indicia has been accessed a predetermined number of times; and combining means, responsive to said transducer outputs and said counting means signal, for combining the outputs for each access to form for said accessed indicia an enhanced output.

2. The apparatus of claim 1, wherein the combining means include an accumulating shift register for receiving digital representations of a plurality of accessed indicia outputs and combining repeated accesses of the same indicia by loop shifting the digital representation in timed relationship to accessing the indicia.

3. The apparatus of claim 1, wherein the combining means include a resonant circuit for receiving repeatedly accessed indicia outputs and enhancing the outputs by oscillatory augmentation.

4. Apparatus for enhancing information-indicating output signals obtainable from information carried as magnetic spots on a magnetic surface, including:

a magnetic head, having a number of reading gaps, each gap operable to repeatedly read the same spot on said surface available to said gap and cause an output signal for each reading;

motive means, associated with said surface and head, for relatively moving said surface and head to make each spot in turn available for reading by each head gap;

counting means, associated with said head and motive means, operable to supply a signal when a spot has been read a predetermined number of times; and combining means, responsive to said head output signals and said counting means signal, for combining the output signal caused by reading a spot to form for that spot an enhanced output signal.

5. The apparatus of claim 4, wherein the combining means include an accumulating shift register for receiving digital representations of a plurality of outputs resulting from reading magnetic spots and combining repeated reading of the same spot by loop shifting the digital representations in timed relationship to reading the spots.

6. The apparatus of claim 4, wherein the combining means include a resonant circuit for receiving output signals resulting from repeatedly reading the same spots and enhancing the outputs by oscillatory augmentation.

7. In a combination having a magnetic head for obtaining electrical signals as a result of relative motion between the head and a magnetic surface carrying previously recordable magnetizable spots, the signals being indicative of information recorded as spots on said surface, the improvement comprising means for enhancing the signal-to-noise ratio of the signal obtained by the transducer, including:

accessing means, connected to the head, for accessing each of said spots carried on said surface a plurality of times and causing a plurality of outputs corresponding to said plurality of accesses;

combining means, responsive to said plurality of outputs, operable to combine said outputs and form an enhanced output indicative of each of said spots; and reference means, connected to the magnetic head and the accessing means, for adjusting the outputs of the accessing means in accordance with previously recorded magnetic spots on the magnetic surface indicative of timing information.

8. Apparatus for enhancing information-indicating output signals obtained by reading information carried as magnetized spots on a magnetic surface including:

a magnetic head, having a plurality of reading gaps, each gap operable to read spots on said surface passing said gap and cause an output signal for said spot;

motive means, associated with said surface and head, for moving said surface past said head to cause each spot to pass each head gap in turn;

a plurality of delay means, each associated with a different one of substantially all of said head gaps, for receiving from said gaps output signals resulting from spots passing the corresponding gaps in turn and supplying delayed output signals in timed relation with the movement of the spots past the gaps;

combining means, responsive to said delayed output signals, for combining said delayed output signals to form for each spot read an enhanced output signal; and reference means, connected between a number of reading gaps operable to read magnetic spots on the magnetic surface indicative of timing information and the delay means for adjusting the amount of delay of the output signals from each delay means in accordance with the timing information read by aforesaid reading gaps.

9. The method of enhancing the information-indicating output obtainable by multi-position transducers from data and timing information carried as indicia on a medium, comprising the steps of:

relatively moving said medium and transducer to cause each said data information indicia to pass each position of a transducer in turn, and each said timing information indicia to pass a number of positions of another transducer;

accessing data information indicia on said medium passing said positions and causing a data output for each said data information indicia, and a timing output for each said timing information indicia;

receiving said data and timing outputs resulting from data information indicia passing the corresponding positions in turn;

delaying said data outputs as a function of the timing outputs so that they are in step with the relative movement of said medium and transducer; and combining said delayed outputs to form for each said accessed indicia an enhanced output.

10. The method of enhancing the information-indicating output obtainable from information carried as indicia on a medium, including the steps of:

repeatedly accessing the same indicia on said medium causing an output for each access;

moving said medium to make each said indicia available for accessing in turn;

counting the number of times each said indicia has been accessed and indicating when it has been accessed a predetermined number of times; and combining the outputs for each access to form for each said accessed indicia an enhanced output when said indication occurs.

* * * * *